(12) United States Patent
Worley et al.

(10) Patent No.: US 11,790,071 B2
(45) Date of Patent: Oct. 17, 2023

(54) EMBEDDED TRACE CAPACITIVE SIGNET STAMP

(71) Applicant: SnowShoeFood Inc., Portland, OR (US)

(72) Inventors: Thomas Ree Worley, Alpharetta, GA (US); Jesse Edward Stewart, Portland, OR (US); Alex Norman Haines, Beaverton, OR (US); Sheradyn Thomas Mikul, Wausau, WI (US); Charles Alan McAllister, Portland, OR (US)

(73) Assignee: SnowShoeFood, Inc., Portland, OR (US)

( * ) Notice: Subject to any disclaimer, the term of this patent is extended or adjusted under 35 U.S.C. 154(b) by 0 days.

(21) Appl. No.: 17/666,535

(22) Filed: Feb. 7, 2022

(65) Prior Publication Data

US 2022/0164428 A1 May 26, 2022

Related U.S. Application Data

(63) Continuation of application No. 16/626,870, filed as application No. PCT/US2018/040247 on Jun. 29, 2018, now Pat. No. 11,328,046.

(60) Provisional application No. 62/527,151, filed on Jun. 30, 2017.

(51) Int. Cl.
*G06F 21/34* (2013.01)
*G06K 7/08* (2006.01)

(52) U.S. Cl.
CPC .............. *G06F 21/34* (2013.01); *G06K 7/081* (2013.01)

(58) Field of Classification Search
CPC ........ G06F 21/34; G06F 3/0393; G06F 3/045; G06K 7/081
USPC ............................................................ 726/7
See application file for complete search history.

(56) References Cited

U.S. PATENT DOCUMENTS

| 10,572,695 B1* | 2/2020 | Guise ...................... G06F 21/86 |
| 2017/0187118 A1* | 6/2017 | Polemi ..................... H01Q 9/28 |
| 2017/0308232 A1* | 10/2017 | Park ...................... G06F 3/0443 |
| 2018/0211071 A1* | 7/2018 | Lo .......................... G06K 19/067 |
| 2021/0141946 A1* | 5/2021 | Lee ....................... H04L 9/0894 |

* cited by examiner

*Primary Examiner* — Jacob Lipman
(74) *Attorney, Agent, or Firm* — Patent Technologies, LLC; Robert D. Gunderman, Jr.

(57) ABSTRACT

An embedded trace capacitive signet is described. The embedded trace capacitive signet provides for authentication and validation through interaction with a touch screen of a computing device such as a smart phone. The embedded trace capacitive signet has a substrate such as a card, a plurality of conductive circle points affixed to the substrate, a user conductive area that allows a user to provide capacitance to the conductive circle points, and thin traces connecting each circle point to the user conductive area. Placing the circle points in different locations produces unique cards that can be detected by a touch screen of a computing device to initiate a software based application.

9 Claims, 10 Drawing Sheets

EMBEDDED TRACE CAPACITIVE SIGNET STAMP

CROSS REFERENCE TO RELATED PATENT APPLICATIONS

This application is a continuation of U.S. patent application Ser. No. 16/626,870 filed Dec. 26, 2019 entitled "Embedded Trace Capacitive Signet Stamp", which is a 371 of International Application Number PCT/US2018/040247 filed Jun. 29, 2018 entitled "Embedded Trace Capacitive Signet Stamp", which claims priority to U.S. Patent Application Ser. No. 62/527,151 filed Jun. 30, 2017 entitled "Embedded Trace Capacitive Signet Stamp", the entire disclosures of which are incorporated herein by reference in their entirety, including all specifications, drawings, and appendices.

BACKGROUND OF THE INVENTION

1. Field of the Invention

The present invention relates generally to authentication and validation, and more particularly to an Embedded Trace Capacitive Signet Stamp.

2. Description of Related Art

Validation and authentication for a variety of purposes is commonly done by way of stamps, punch cards, loyalty cards, magnetic stripe cards, RFID cards, and the like. Validation and authentication may be done for entry to an event, such as an entertainment event, for payment purposes, for identification and security, and the like. The most basic form of validation and authentication is printed paper, such as a paper ticket, paper punch card, etc. As technology has advanced and the need for anti-counterfeiting has grown, advancements such as magnetically encoded strips, radiofrequency identification elements, bar codes, QR codes, and other such elements have become commonplace, as these elements are oftentimes embedded or otherwise integrated into a card, ticket, or a similar validation or authentication device.

As electronic devices such as smart phones and similar devices continue to proliferate, there has been a trend toward simplifying the number of cards, tickets, paper and plastic items that one carries for authentication, validation, and related purposes. While often such authentication and validation can be done entirely on the electronic device, there still remains a need for outside authentication and validation by way of an additional card, ticket, stamp, or the like. Such authentication and validation can be done either by the holder of the electronic device or by another individual or entity as the authenticator or validator.

Electronic devices are commonly constructed with touch screens such as capacitive touch screens. The ability to integrate an authentication or validation item with a touch screen and underlying software applications on the electronic device or through an electronic device to a network or network based computing element opens up immense possibilities for authentication, validation, security, payment processing, and transactional business endeavors. The present invention and the various embodiments described and envisioned herein address this heretofore unmet need.

BRIEF SUMMARY OF THE INVENTION

In accordance with the present invention, there is provided an embedded trace capacitive signet stamp comprising a card or similar substrate having a conductive pattern of circles or points with conductive traces or material leading back to a conductive area that a user will contact to provide the necessary capacitance for the embedded trace capacitive signet stamp to activate and interact with a touch screen of a computing device, such as a smart phone. A handle or similar structure may be incorporated into the device to allow the user to more easily grasp the conductive area of the device and create an electronic stamp as further described herein. The handle or similar structure with the conductive area may also fold flat, allowing for ease of storage and portability of the device.

The foregoing paragraph has been provided by way of introduction, and is not intended to limit the scope of the invention as described by this specification, claims and the attached drawings.

BRIEF DESCRIPTION OF THE DRAWINGS

The invention will be described by reference to the following drawings, in which like numerals refer to like elements, and in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and drawings attached hereto.

DESCRIPTION OF THE PREFERRED EMBODIMENTS

A device that uniquely interacts with a touch screen of an electronic computing device such as a "smart phone" is disclosed. The device may be in the form of a card that can be carried in a wallet or purse and contains embedded conductive traces that are printed, bonded, fabricated, cut or otherwise deposited on a substrate such as a paper or plastic card. The conductive traces may be made from a conductive material such as, but not limited to, a conductive ink that is printed on the substrate in a unique pattern that is recognized by the electronic device when the pattern contacts the touch screen of the device. Recognition of the unique conductive trace pattern in turn activates software in the electronic device. The software may include security software, activation of an app, a video, a store discount, sports statistics, giveaways at events or concerts, entrance to a game, concert or event, entrance and ticketing for transportation such as subways, buses, trains, subscription and gift services, digital loyalty cards, hospitality, toys, games, education, and the like. The device may also be integrated with product packaging and displays; for example, a flat stamp incorporated into a box for food or beverage.

A user contact area or structure may be in the form of a conductive pad that may include a handle or similar structure. The handle may be foldable in some embodiments of the present invention, and may further include both a conductive material as well as a substrate or backing that helps to reinforce the handle and provide rigidity needed for the device of the present invention to act as an electronic stamp. The handle may also fold flat for ease of storage, as will be further described herein.

U.S. Pat. No. 9,152,279 to Moberg et al. and entitled "Tool And Method For Authenticating Transactions" and U.S. Pat. No. 9,298,907 to Moberg et al. and entitled "Methods For Enabling Real-Time Digital Object And Tangible Object Interactions" are both incorporated by reference herein in their entirety, as permissible by national or regional laws.

Figure 1:
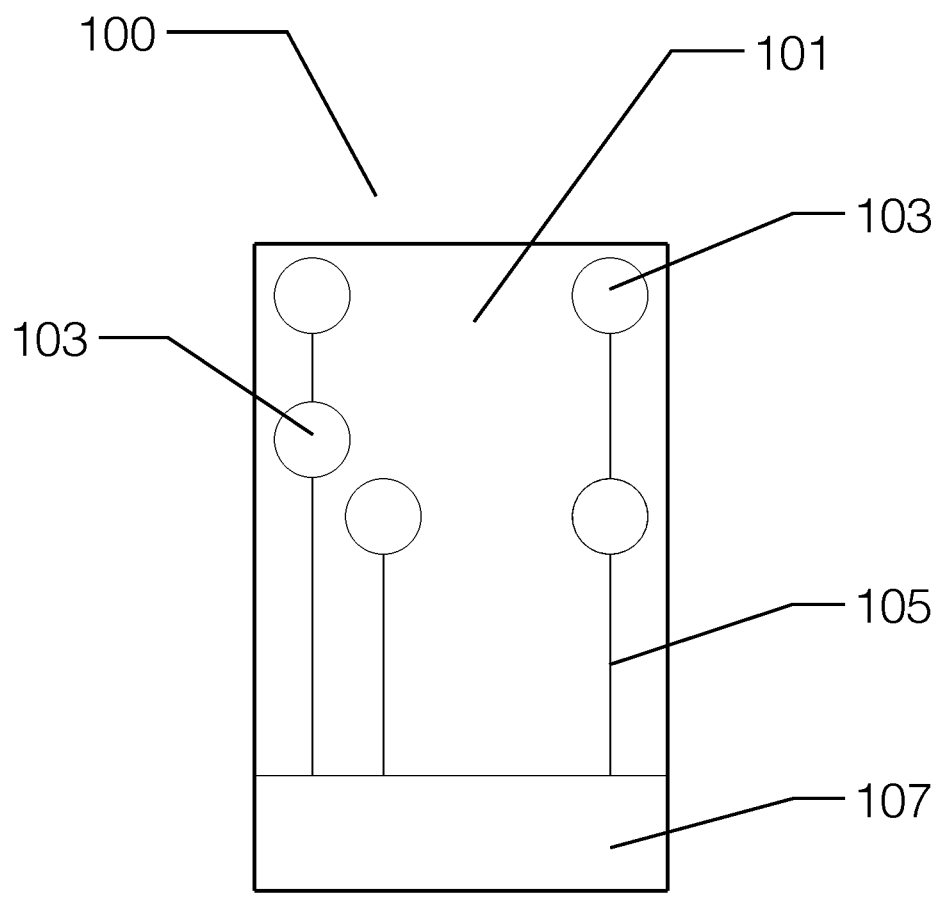
FIG. 1 depicts a plan view of an embedded trace capacitive signet.

FIG. 1 depicts an example of an embedded trace capacitive signet 100 in accordance with the present invention. A substrate 101 such as a card can be seen with a conductive pattern thereupon. The substrate 101 may be made from cardboard or paper, a plastic, vellum, or the like. While the figures depict the conductive pattern exposed, in some embodiments the conductive pattern may be embedded within another layer of material such as cardboard, paper, a plastic, vellum, or the like to both protect the conductive pattern and hide it from view. Security techniques such as glues, adhesives, and the like may be employed to bond the layers together such that exposure of the conductive traces is not possible without destroying the card. Cuts, slits, or various other mechanical alterations to the card to cause it to fall apart if tampered with may also be incorporated into the device.

The conductive trace pattern has conductive points 103 such as the five circles or points depicted in FIG. 1 that replicate the touch of five fingers from a human hand. In some embodiments of the present invention, there may be more than five circles or points, or less than five circles or points. In addition, in some embodiments of the present invention, the points may be of a variety of geometries, for example, octagon, square, triangle, rectangle, hexagon, or the like. The conductive circles or points are each made from a conductive material and each have a conductive trace 105 that leads back to a user contact area (a conductive area) 107 where the user is in contact with. The contact or conductive area 107 is of sufficient size to allow a user to easily land on the conductive area with a finger or thumb. The user must be in contact with this area 107 to provide capacitance for the five circles or points 103 in order for the device (card) to work. The user contact area 107 may be located along a side of the substrate 101, such as depicted in FIG. 1. The user contact area 107 may be rectangular or of a conforming geometric shape.

Figure 5:
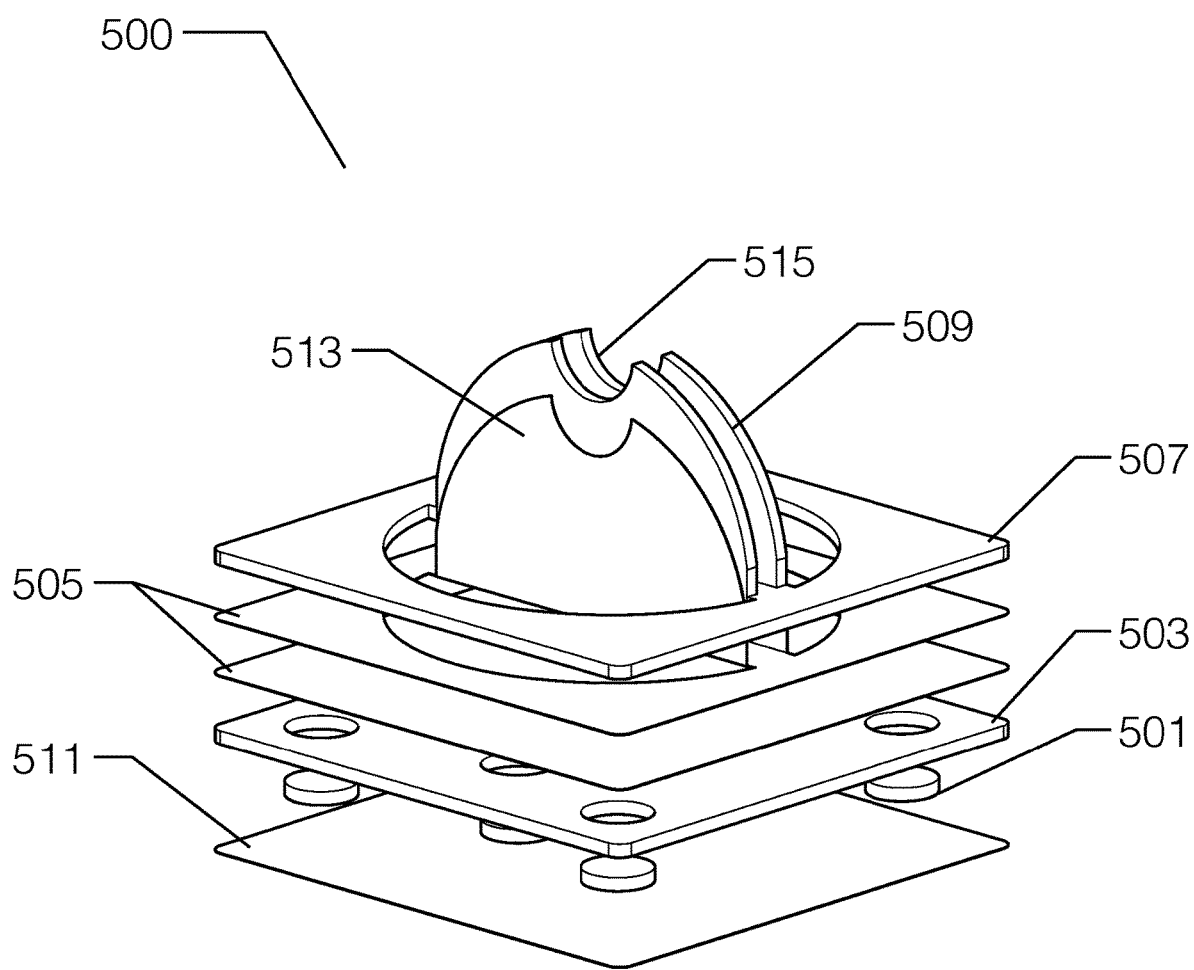
FIG. 5 shows an exploded view of the embedded trace capacitive signet configured as a stamp.

In one embodiment of the present invention, the traces 105 from each circle or point to the user contact area (conductive area) 107 must be as thin as possible so that the touch screen of the device that the embedded trace capacitive signet is interacting with does not detect them and confuse a trace 105 with a point or circle 103. In another embodiment of the present invention, a conductive layer, such as that depicted in FIG. 5, is used as a means to interconnect the conductive points 103, and may be a planar sheet of conductive material, or may, in some embodiments of the present invention, be a sheet that contains conductive traces or interconnects on a dielectric or insulating sheet or layer.

The conductive traces 105 and circle points 103 are printed, bonded, fabricated, cut or otherwise deposited on the substrate 101. The conductive traces 105 and circle points 103 may be made from a conductive material such as, but not limited to, a conductive ink that is printed on the substrate in a unique pattern. The conductive points 105 may be affixed to the outer surface of the substrate, the outer surface being one of the two planar surfaces of the substrate 101 that would contact a touch screen of an electronic device while in use. In some embodiments of the present invention, the conductive points 105 are affixed through openings in the substrate, where the openings in the substrate are cut by way of a die, a laser, a blade or cutting head, or the like.

In some embodiments of the present invention, a bottom layer covers the conductive points and the substrate, and may be made from a paper, a plastic, a coating, or the like. The bottom layer serves not only to protect the conductive points and the substrate, but also serves to obscure the conductive point pattern ("the signet") from view. This bottom layer may also contain graphics, lettering, or the like. The substrate and, in some embodiments of the present invention, the bottom layer covering, may be rectangular to conform to the geometric appearance of a business card, a credit card, or the like. Other shapes may also be employed, for example, round, square, hexagonal, octagonal, and the like.

As can be seen in FIG. 1, circles or points 103 can also be interconnected one with another by way of a thin trace 105.

The circle points 103 are placed in different locations to produce unique cards. There are estimated to be more than 3 million unique patterns that can be created with the basic technology described. Different geometries and configurations as well as changes to touch screen detection and processing will yield significantly more unique patterns.

Figure 2:
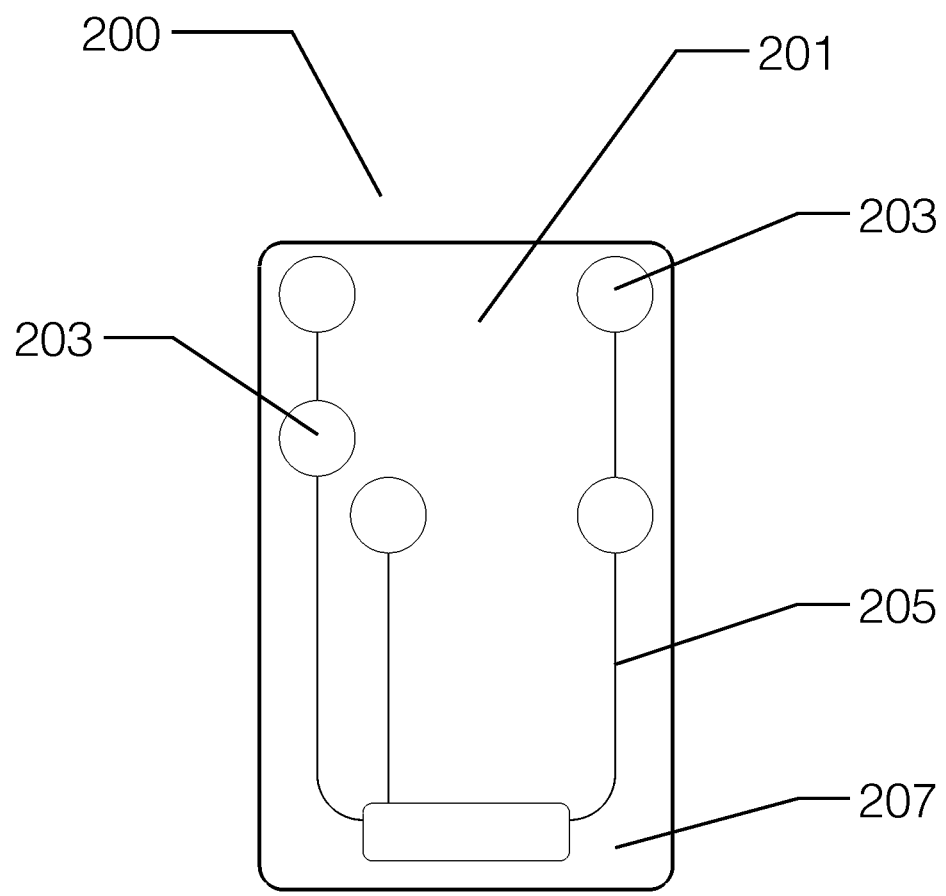
FIG. 2 depicts a plan view of an alternate embodiment of an embedded trace capacitive signet.

FIG. 2 depicts an alternate embodiment of an embedded trace capacitive signet 200 where the traces 205 may be curved or otherwise non-linear. A substrate 201 such as a card can be seen with a conductive pattern thereupon. The substrate 201 may be made from cardboard or paper, a plastic, vellum, or the like. While the figures depict the conductive pattern exposed, in some embodiments the conductive pattern may be embedded within another layer of material such as cardboard, paper, vellum, a plastic or the like to both protect the conductive pattern and hide it from view. Security techniques such as glues, adhesives, and the like may be employed to bond the layers together such that exposure of the conductive traces is not possible without destroying the card. Cuts, slits, or various other mechanical alterations to the card to cause it to fall apart if tampered with may also be incorporated into the device.

The conductive trace pattern has five circles or points 203 that replicate the touch of five fingers from a human hand. In some embodiments of the present invention, there may be more than five circles or points, or less than five circles or points. In addition, in some embodiments of the present invention, the points may be of a variety of geometries, for example, octagon, square, triangle, rectangle, hexagon, or the like. The five circles or points are each made from a conductive material and each have a thin trace 205 that leads back to a conductive area 207 where the user is in contact with. The conductive area 207 is of sufficient size to allow a user to easily land on the conductive area with a finger or thumb. The user must be in contact with this conductive area 207 to provide capacitance for the five circles or points 203 in order for the device (card) to work. The traces 205 from each circle or point to the user contact area (conductive area) 207 must be as thin as possible so that the touch screen of the device that the embedded trace capacitive signet is interacting with does not detect them and confuse a trace 205 with a point or circle 203. Circles or points 203 can also be interconnected one with another by way of a thin trace 205. The thin trace 205 may be curved or otherwise non-linear for some or all of the return conductive traces.

The conductive traces 205 and circle points 203 are printed, bonded, fabricated, cut or otherwise deposited on the substrate 201. The conductive traces 205 and circle points 203 may be made from a conductive material such as, but not limited to, a conductive ink that is printed on the substrate in a unique pattern.

The circle points 203 are placed in different locations to produce unique cards. There are estimated to be more than 3 million unique patterns that can be created with the basic technology described. Different geometries and configurations as well as changes to touch screen detection and processing will yield significantly more unique patterns. For example, software-based techniques may yield a greater number of unique patterns.

Figure 3:
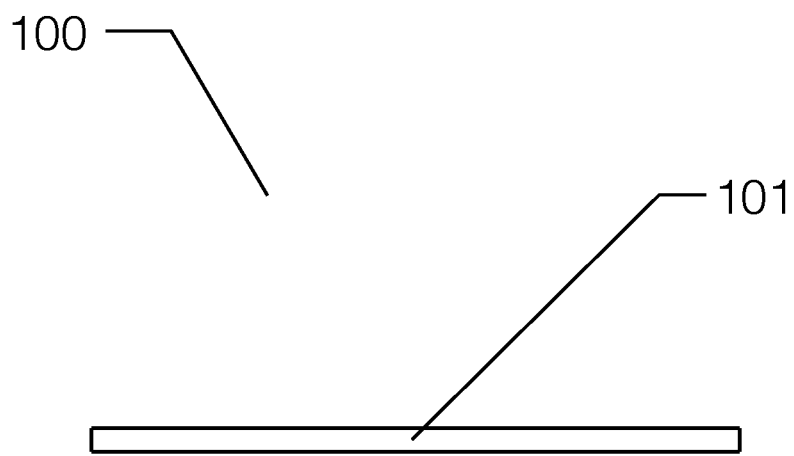
FIG. 3 depicts a side view of the embedded trace capacitive signet of FIG. 1.

FIG. 3 depicts a side view of the embedded trace capacitive signet 100 of FIG. 1 illustrating a typical thickness of the substrate 101.

Figure 4:
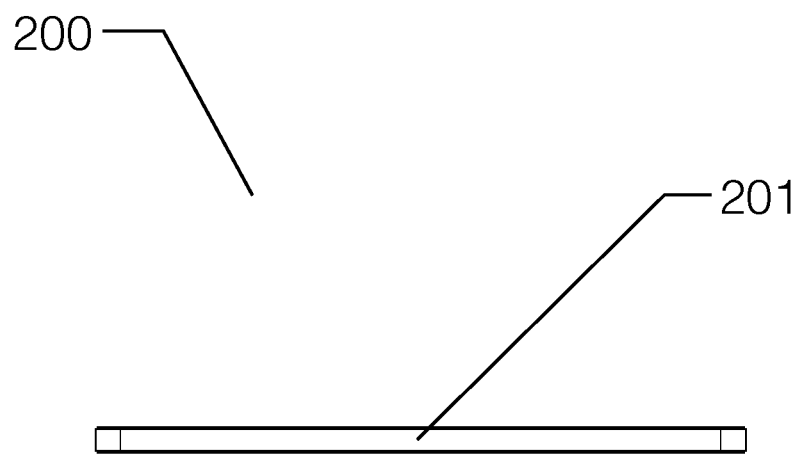
FIG. 4 depicts a side view of the embedded trace capacitive signet of FIG. 2.

FIG. 4 depicts a side view of the embedded trace capacitive signet 200 of FIG. 2 again illustrating a typical thickness of the substrate 201.

To use the embedded trace capacitive signet, embodied for example in a card, the card is placed in proximity to or in contact with a touch screen of an electronic device. The unique pattern of the capacitive circle points of the card, when held by a user, are detected by the touch screen and in turn activate or otherwise enable a software application. Activation of software applications by the embedded trace capacitive signet of the present invention is also considered an integral part of the present invention and the various embodiments described and envisioned herein.

Figure 6:
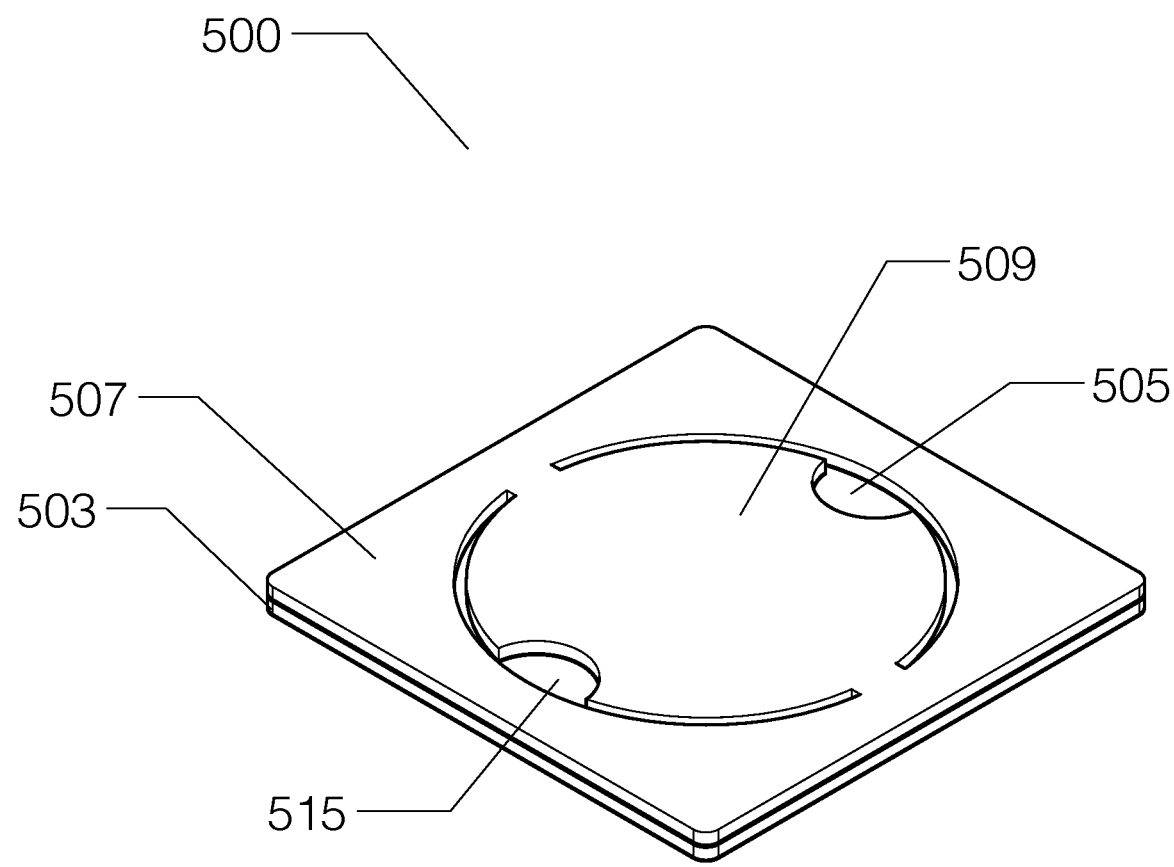
FIG. 6 shows the embedded trace capacitive signet configured as a stamp in a storage position.
Figure 7:
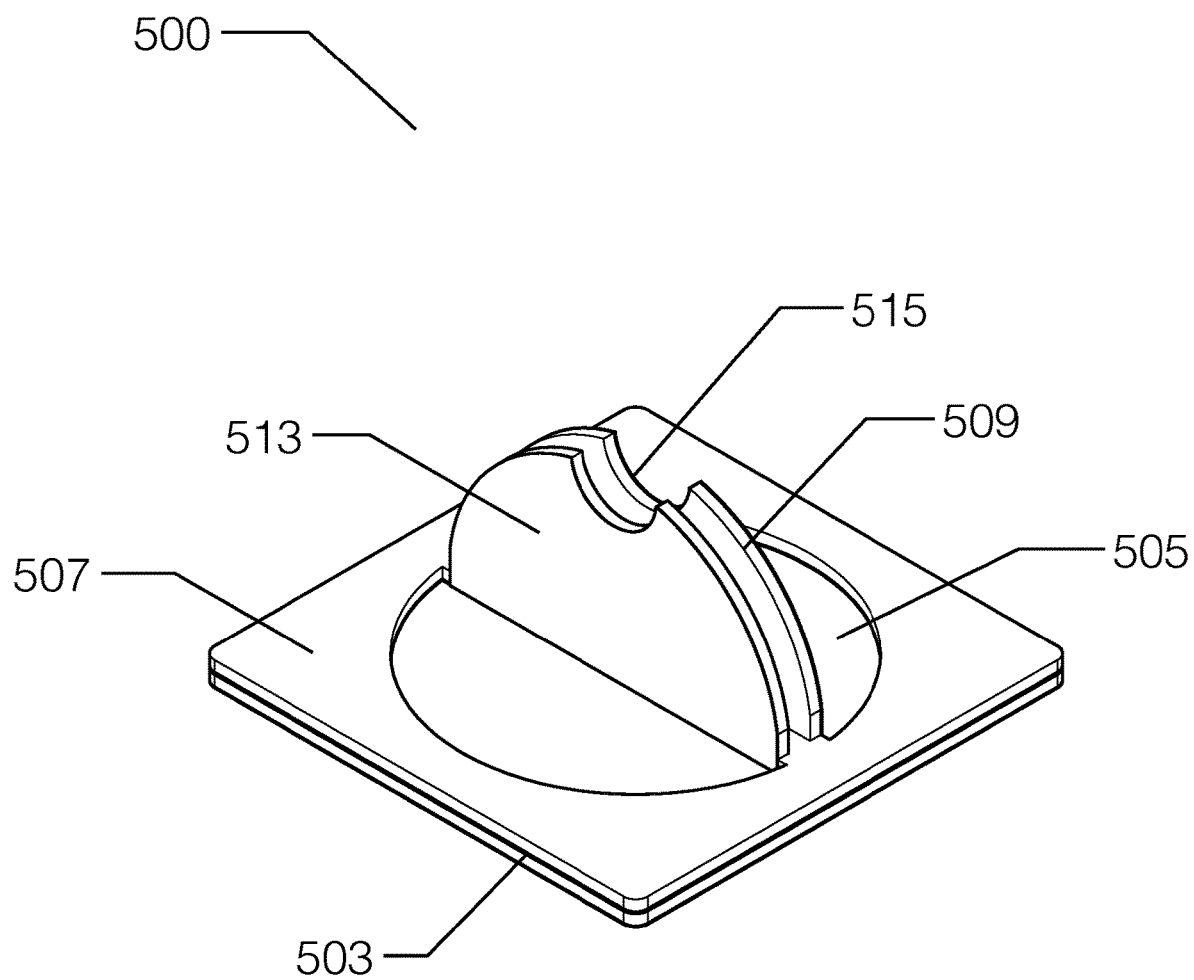
FIG. 7 shows the embedded trace capacitive signet configured as a stamp in an in use position.

FIG. 5 shows an exploded view of the embedded trace capacitive signet configured as a stamp 500, depicting the key components of the device. Building on the disclosure and details provided heretofore, a stamp-based device includes a novel foldable handle and foldable conductive user contact area, as depicted in FIGS. 5-7. A substrate 503 contains a pattern of conductive regions, such as the embedded conductive points 501 depicted. The embedded conductive points 501 are affixed through openings in the substrate 503 that may be die cut, punched, laser cut, machine cut, or the like. In some embodiments of the present invention, the conductive points 501 are affixed to an outer surface of the substrate 503. The substrate 503 may be made from a cardboard, a paper, a plastic, or a composite material, and may be rectangular in shape. A conductive layer or layers 505, such as a metal foil or a conductive polymer sheet, electrically connects the conductive points 501 to the user contact area, which is shown in FIG. 5 as a foldable conductive user contact area 513, which may be contacted by the user directly or through a handle of some form, like the foldable handle 509 shown. The foldable handle 509 is formed from the top layer 507, and may be formed as two discrete elements that have the same general shape and can be mated or otherwise joined together when folded upward. The foldable handle is formed from two similar punched out areas of the top layer 507. Each of the punched out areas, or two discrete handle elements have a D shape with the linear portion of each D shape being foldably attached to the main part of the top layer 507. A finger slot 515 may also be employed where the curved portion of each D shape is notched or slotted to allow each D shaped element to be easily folded upward into an in use position. The finger slot 515 may be a curved semi-circular cutout region of each D shaped handle element as more explicitly depicted by way of example, and not limitation, in FIG. 5. A conductive layer 505 is also cut or otherwise formed in a geometry similar to that of each D shaped handle element to form a foldable conductive user contact area 513 on each side of the foldable handle.

In some embodiments of the present invention, the handle may be formed with different shapes and construction. For example, the handle may comprise a key chain or key fob arrangement. A fold out key ring, for example, may act as an electrically conductive handle.

A thin bottom layer 511 may be laminated over the conductive regions to visually obscure the conductive pattern and provide a printable region for text and graphics. The bottom layer 511 may be made from cardboard, paper, or a plastic film or sheet. The conductive regions may be in the form of an embedded material with conductive properties or a conductive material deposited or printed onto the substrate. The conductive regions include the conductive points 501. The substrate 503 can be constructed of any material that will function as a dielectric layer, insulating the conductive regions of the device and preventing interference by the user touching the conductive layer. The conductive layer(s) 505 can be made of any material capable of transferring an electron charge from the user to the conductive regions, such as a metal foil or a conductive coating. The top layer 507 may be made from cardboard, paper, or a plastic film or sheet. The top layer 507 may also contain text or graphics. The bottom layer 511 may also contain text or graphics.

The first punched out area of the top layer and the second punched out area of the top layer have generally the same geometries to allow for the formation of a foldable handle comprising the alignment of the first punched our area and the second punched out area when each punched out area is folded upward. The conductive layer is also cut or otherwise formed in a geometry similar to that of each D shaped handle element to form a foldable conductive user contact area on each side of the foldable handle when the handle is folded upward in an in use position. The foldable conductive user contact area may be of a similar D shape to that of the foldable handle, and may also incorporate finger slots that align with the finger slots and the D shape of the foldable handle. The portion of the conductive layer 505 that makes up the foldable conductive user contact area 513 may also be adhered to or otherwise bonded to the foldable handle 509.

FIG. 6 shows the embedded trace capacitive signet configured as a stamp 500 in a storage position. The foldable handle 509 is unfolded and laying flat with the top layer 507. The semi-circular finger slot 515 can also be seen. Since the foldable handle 509 has not yet been folded, there are no creases or fold marks evident along the linear portion of each D shaped handle element. The overall shape of the embedded trace capacitive signet stamp depicted in FIG. 6 is rectangular, and may be generally square in some embodiments. A square shaped embedded trace capacitive signet stamp may have a supplemental use as, for example, a drink coaster, and may also contain graphics or text for advertising or marketing purposes.

FIG. 7 shows the embedded trace capacitive signet configured as a stamp in an in use position. The foldable conductive user contact area 513 can be seen. It should be noted that in some embodiments of the present invention a second foldable conductive user contact area is employed on the second discrete handle element. In some embodiments, however, a single foldable conductive user contact area is employed.

The foldable conductive user contact area can be seen adhered to the foldable handle where both discrete handle elements have a foldable conductive user contact area adhered thereto.

Figure 8:
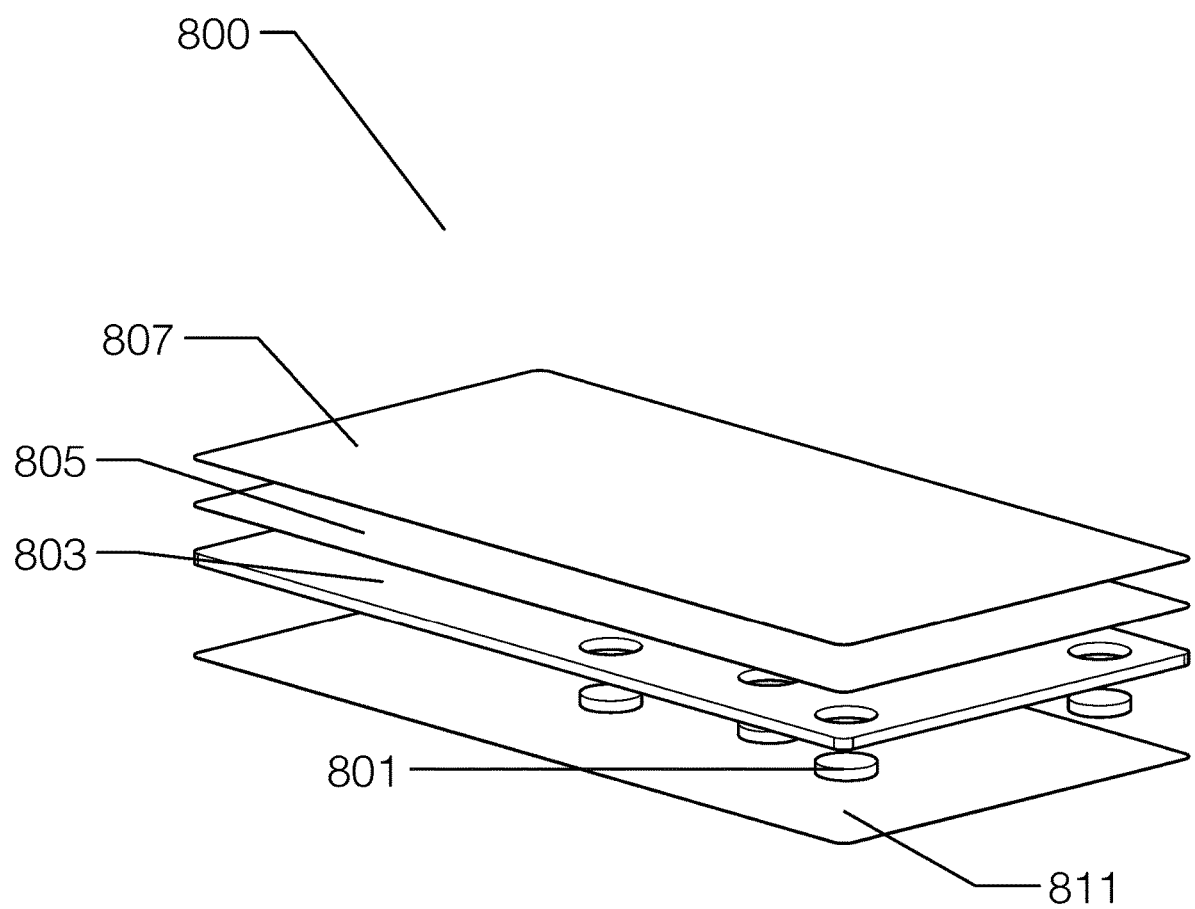
FIG. 8 shows a further embodiment of the embedded trace capacitive signet.

FIG. 8 shows a further embodiment of the embedded trace capacitive signet 800 where a foldable handle is not present. Conductive points 801 are attached or affixed to an outer surface of the substrate 803, or may be affixed through openings in the substrate 803. The conductive points 801 may include circles or points that replicate the touch of fingers from a human hand. In some embodiments of the present invention, there may be more than five circles or points, or less than five circles or points. In addition, in some embodiments of the present invention, the points may be of a variety of geometries, for example, octagon, square, triangle, rectangle, hexagon, or the like. The conductive circles or points are each made from a conductive material and are electrically joined by a conductive layer(s) 805 that may include conductive traces. A user contact area may be included in the embedded trace capacitive signet 800 depicted in FIG. 8, or may be included in an external device that attaches to, and makes electrical contact with, the conductive points 801. The user contact area in this regard may be a holder or retainer that grasps the embedded trace capacitive signet 800, and may pierce or otherwise engage with the conductive layer 805.

Conductive layer(s) 805 are similarly employed to electrically join the conductive points 801. A top layer 807 can also be seen along with a bottom layer 811. The top layer 807 may be made from cardboard, paper, or a plastic film or sheet. The top layer 507 may also contain text or graphics.

The conductive regions formed by the conductive points 801 represent a unique pattern which can be detected by a touch screen device and subsequently decoded with software to validate a transaction.

A thin bottom layer 811 may be laminated over the conductive regions to visually obscure the conductive pattern and provide a printable region for text and graphics. The bottom layer 511 may be made from cardboard, paper, or a plastic film or sheet. The bottom layer 811 may also contain text or graphics.

The conductive regions may be in the form of an embedded material with conductive properties or a conductive material deposited or printed onto the substrate. The conductive regions include the conductive points 801. The substrate 803 can be constructed of any material that will function as a dielectric layer, insulating the conductive regions of the device and preventing interference by the user touching the conductive layer. The conductive layer(s) 805 can be made of any material capable of transferring an electron charge from the user to the conductive regions, such as a metal foil or a conductive coating.

Figure 9:
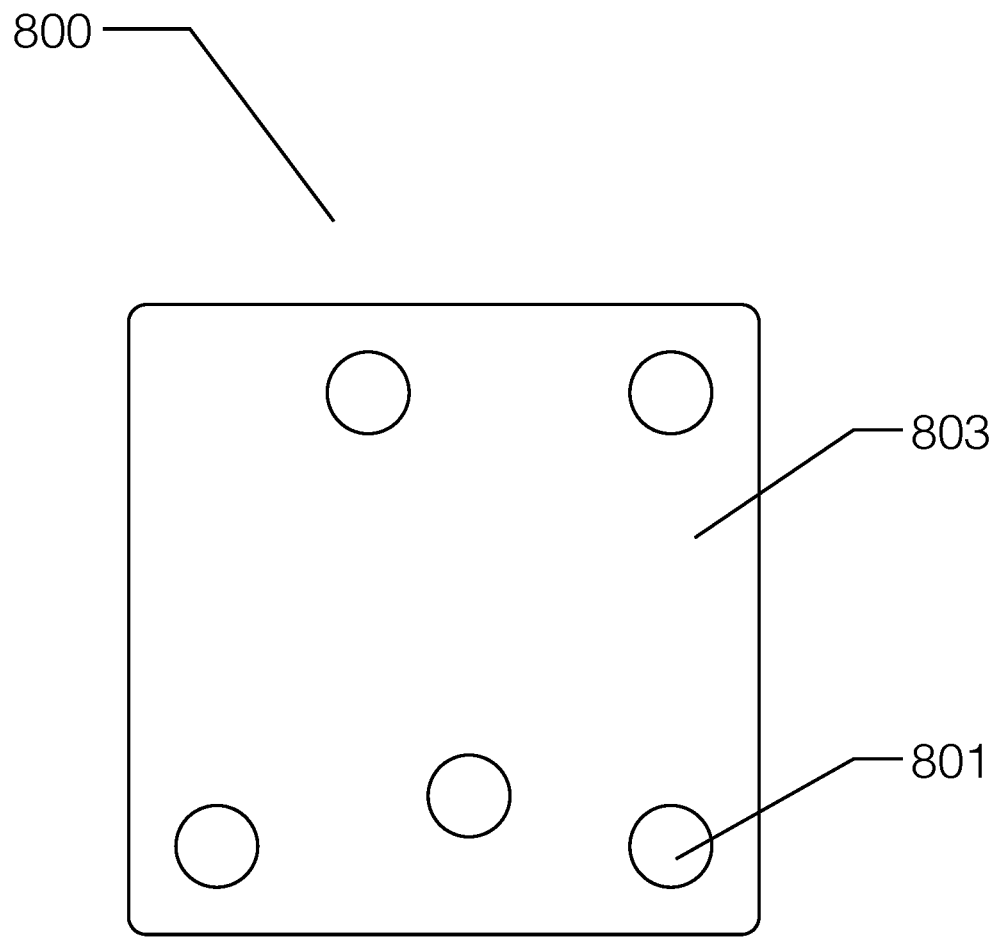
FIG. 9 depicts a plan view of the embedded trace capacitive signet of FIG. 8.

FIG. 9 depicts a plan view of the embedded trace capacitive signet of FIG. 8. For clarity, a bottom layer is not shown. The conductive regions are not centered on the substrate 803, thereby allowing the user to hold one edge of the device while contacting a touch screen with the opposite side of the device. The user's electrical charge would then be transferred through the top layer 807 (see FIG. 8) of the device along the conductive layer 805 (see FIG. 8) that is laminated or adhered to the substrate 803, to the conductive pattern and through the thin bottom layer 511 (see FIG. 5), which could then be placed in contact with a capacitive sensing touch screen.

Figure 10:
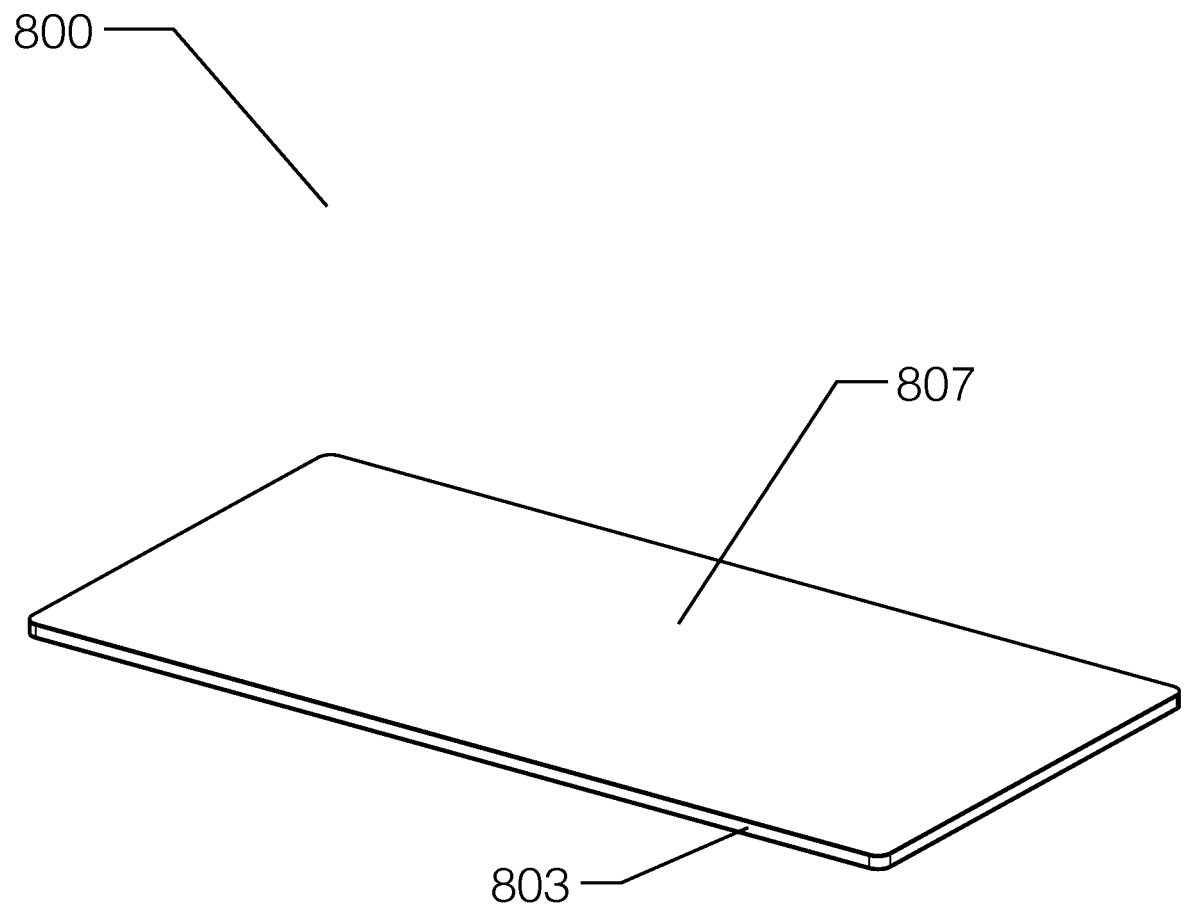
FIG. 10 depicts a perspective view of the embedded trace capacitive signet of FIG. 8.

Lastly, FIG. 10 depicts a perspective view of the embedded trace capacitive signet of FIG. 8. The embodiment depicted by FIGS. 8-10 do not require a handle to operate and could be incorporated into flat products, such as business cards or beverage coasters. Graphics and text could be printed on the outer layers without impacting the functionality of the device.

To use the embedded trace capacitive signet stamp, the device is placed in proximity to or in contact with a touch screen of an electronic device. The unique pattern of the conductive points of the card, when held by a user, are detected by the touch screen and in turn activate or otherwise enable a software application. The user grasps the embedded trace capacitive signet stamp by a conductive user contact area such as contained on a foldable handle, such that the capacitance of the user is transferred to conductive points that are embedded or otherwise contained in the embedded trace capacitive signet stamp. A unique pattern of conductive points provides an electronic signet for activation of software applications. Activation of software applications by the embedded trace capacitive signet stamp of the present invention is also considered an integral part of the present invention and the various embodiments described and envisioned herein.

It is, therefore, apparent that there has been provided, in accordance with the various objects of the present invention, an embedded trace capacitive signet stamp.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and drawings appended herein.

What is claimed is:

1. An embedded trace capacitive signet stamp comprising:
   a substrate;
   a plurality of conductive points affixed with the substrate;
   a user contact area that allows a user to provide capacitance to the conductive points;
   a conductive layer connecting each conductive point to the user contact area; and
   a tamper resistant protective layer that covers the conductive points from view and causes damage to the embedded trace capacitive signet stamp if tampered with.

2. The embedded trace capacitive signet stamp of claim 1, wherein the conductive points are affixed to an outer surface of the substrate.

3. The embedded trace capacitive signet stamp of claim 1, wherein the conductive points are affixed through openings in the substrate.

4. The embedded trace capacitive signet stamp of claim 1, further comprising a bottom layer that covers the conductive points and the substrate.

5. The embedded trace capacitive signet stamp of claim 1, wherein the bottom layer contains graphics.

6. The embedded trace capacitive signet stamp of claim 1, wherein the substrate is rectangular.

7. The embedded trace capacitive signet stamp of claim 1, wherein the user contact area is located along a side of the substrate.

8. The embedded trace capacitive signet stamp of claim 1, wherein the conductive layer is a planar sheet of conductive material in electrical contact with the conductive points and the user contact area.

9. The embedded trace capacitive signet stamp of claim 1, wherein the conductive layer comprises conductive traces in electrical contact with the conductive points and the user contact area.

\* \* \* \* \*